(12) United States Patent
Akagi

(10) Patent No.: US 11,034,322 B2
(45) Date of Patent: Jun. 15, 2021

(54) AUTOMOBILE INTERIOR COMPONENT

(71) Applicant: KASAI KOGYO CO., LTD., Kanagawa (JP)

(72) Inventor: Haruki Akagi, Ebina (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 21 days.

(21) Appl. No.: 16/626,763

(22) PCT Filed: Aug. 22, 2017

(86) PCT No.: PCT/JP2017/029945
§ 371 (c)(1),
(2) Date: Dec. 26, 2019

(87) PCT Pub. No.: WO2019/038831
PCT Pub. Date: Feb. 28, 2019

(65) Prior Publication Data
US 2020/0156584 A1 May 21, 2020

(51) Int. Cl.
*B60R 21/213* (2011.01)
*B60R 13/02* (2006.01)
(Continued)

(52) U.S. Cl.
CPC .......... *B60R 21/213* (2013.01); *B60R 13/025* (2013.01); *B60R 13/0275* (2013.01);
(Continued)

(58) Field of Classification Search
CPC ... B60R 21/213; B60R 21/215; B60R 21/232; B60R 2021/23576; B60R 2021/21537;
(Continued)

(56) References Cited

U.S. PATENT DOCUMENTS

2003/0006588 A1  1/2003  Aoki et al.

FOREIGN PATENT DOCUMENTS

DE  102014017531 A1 *  6/2015  ........... B60R 21/213
EP  0900704 A2 *  3/1999  ........... B60R 21/213
(Continued)

OTHER PUBLICATIONS

International Search Report for International Application No. PCT/JP20171029945 dated Nov. 7, 2017, Japan, 2 pages.
(Continued)

*Primary Examiner* — Paul N Dickson
*Assistant Examiner* — Scott F. Underwood
(74) *Attorney, Agent, or Firm* — United IP Counselors, LLC

(57) ABSTRACT

An automotive interior component with an airbag door includes: a core member covering a front pillar and including a hinge part; and a surface member stretched so as to cover a front surface of the core member. The airbag door is a site of the core member partitioned by the hinge part which site is capable of abutting on an airbag. The surface member includes a fold part extending to an outer edge side of a rear surface of the core member so as to cover an edge part connecting between the front surface and the rear surface of the core member. The fold part includes a first fold part not crossing the hinge part and positioned on the airbag door side, and a second fold part bent from the first fold part and crossing the hinge part. The first and second fold parts are stitched with a thread.

6 Claims, 7 Drawing Sheets

(51) Int. Cl.
*B60R 21/215* (2011.01)
*B60R 21/235* (2006.01)

(52) U.S. Cl.
CPC ........ *B60R 21/215* (2013.01); *B60R 13/0206* (2013.01); *B60R 2013/0287* (2013.01); *B60R 2021/23576* (2013.01)

(58) Field of Classification Search
CPC .............. B60R 13/025; B60R 13/0275; B60R 2013/0287
See application file for complete search history.

(56) References Cited

FOREIGN PATENT DOCUMENTS

| | | | |
|---|---|---|---|
| JP | H11-321531 A | | 11/1999 |
| JP | H11321531 A | * | 11/1999 |
| JP | 2002-249015 A | | 9/2002 |
| JP | 2002-362293 A | | 12/2002 |
| JP | 2009-274578 A | | 11/2009 |
| JP | 2010-173386 A | | 8/2010 |
| JP | 2010173386 A | * | 8/2010 |
| JP | 2011-143782 A | | 7/2011 |
| JP | 2012-111462 A | | 6/2012 |
| WO | WO-2009023147 A2 | * | 2/2009 ......... B60R 13/0225 |

OTHER PUBLICATIONS office Action for corresponding Japanese Application No. JP2019-537459 dated Oct. 27, 2020, Japan, 3 pages.

\* cited by examiner

AUTOMOBILE INTERIOR COMPONENT

CROSS-REFERENCE TO RELATED APPLICATIONS

This application is a National Stage Entry application of PCT International Application No. PCT/JP2017/029945, filed on Aug. 22, 2017, the entire contents of which are hereby incorporated by reference.

BACKGROUND

1. Technical Field

The present invention relates to an automotive interior component.

2. Description of the Background

Conventionally, there is an automotive interior component which includes an airbag door. An airbag is housed as being folded between the airbag door and a front pillar. The airbag door forms an opening for the airbag to burst into the cabin by inflation and deployment. The automotive interior component includes a core member which trims the front pillar on cabin side, and a plurality of plate-like reinforcement ribs which project from the rear surface of the core member on the front pillar side, while being spaced apart from each other and extending in the short-side direction of the core member. A thin part as a fragile part is formed at the core member. A site partitioned by the thin part is the airbag door. The airbag door lets the thin part to be partially torn upon inflation and deployment of the airbag, and opens relative to the core member using the thin part as a hinge part. The auxiliary ribs are provided with notches at their sites corresponding to the thin part. Upon the opening of the airbag door, the reinforcement ribs are torn from the notches (Japanese Unexamined Patent Application No. 2010-173386, hereinafter referred to as "Patent Literature 1").

Here, the automotive interior component disclosed by Patent Literature 1 is disadvantageous in that, upon deployment of the airbag, the shock caused by the airbag invites cracks and breaks in the core member on the airbag door side and the surface member which covers the core member. Thus, the broken pieces of part of the automotive interior component are scattered into the cabin.

The problem is addressed by, for example, bonding an aluminum tape or a fabric tape on the core member. Since the aluminum tape 8 is not flexible, the aluminum tape 8 hinders the deployment of the airbag if it is bonded on the core member 4 so as to cross the hinge part 41. Accordingly, as shown in FIG. 7, the aluminum tape 8 is bonded just on the airbag door 42 so as not to cross the hinge part 41.

This, however, avoids cracks upon deployment of the airbag just in the region where the aluminum tape 8 is bonded. Accordingly, as shown in FIG. 7, cracks occur in an outside-tape region S (for example, a region where the bonding the tape is not feasible). Thus, the conventional technique fails to surely minimize scattering of pieces of part of the automotive interior component.

Furthermore, in order for an aluminum tape or a fabric tape to be bonded on the core member formed of polypropylene or the like, a primer must be applied to the core member to keep the tape releasable. Additionally, after the bonding an aluminum tape or a fabric tape on the core member to which a primer has been applied, pressing the aluminum tape or the fabric tape against the core member for adhesion is also essential. Thus, the reinforcing the airbag door with an aluminum tape or a fabric tape includes many steps. Furthermore, since quantitative control on the applying a primer and the pressing is difficult, the conventional technique tends to invite variations in the product quality.

BRIEF SUMMARY

The present invention has been made in view of the foregoing problem, and an object thereof is to provide an automotive interior component which is manufactured through simple steps, and which surely minimizes, upon deployment of the airbag, occurrence of cracks and breaks in the core member and the surface member which would otherwise result in scattering pieces of part of the core member and the surface member into the cabin.

The present invention for achieving the foregoing object is summarized as follows.

The automotive interior component of the present invention is:

(1) An automotive interior component including an airbag door, an airbag being housed as being folded between the airbag door and a pillar, the airbag door forming an opening for the airbag to burst into a cabin by inflation and deployment, the automotive interior component including: a core member covering, on a cabin side, the pillar and including a hinge part being fragile as compared to other portion; and a surface member stretched so as to cover a front surface of the core member on the cabin side. The airbag door is a site of the core member partitioned by the hinge part, the site being capable of abutting on the airbag. The surface member includes a fold part extending to an outer edge side of a rear surface of the core member on a vehicle body side so as to cover an edge part connecting between the front surface of the core member and the rear surface of the core member. The fold part includes a first fold part not crossing the hinge part and positioned on an airbag door side, and a second fold part bent from the first fold part and crossing the hinge part. The first fold part and the second fold part are stitched with a thread.

(2) In the configuration of (1), the first fold part and the second fold part are stitched with the thread while a portion of the second fold part corresponding to the hinge part is avoided from being stitched.

(3) In the configuration of (1) or (2), the first fold part and the second fold part are continuously stitched with the thread.

(4) In the configuration of (1), a first pitch of the thread at which the first fold part is stitched is smaller than a second pitch of the thread at which the second fold part is stitched.

(5) In the configuration of (1), a first thread with which the first fold part is stitched is thicker than a second thread with which the second fold part is stitched.

The present invention provides an automotive interior component which is manufactured through simple steps, and which surely minimizes, upon deployment of the airbag, occurrence of cracks and breaks in the core member and the surface member which would otherwise result in scattering pieces of part of the core member and the surface member into the cabin.

DETAILED DESCRIPTION

Figure 1:
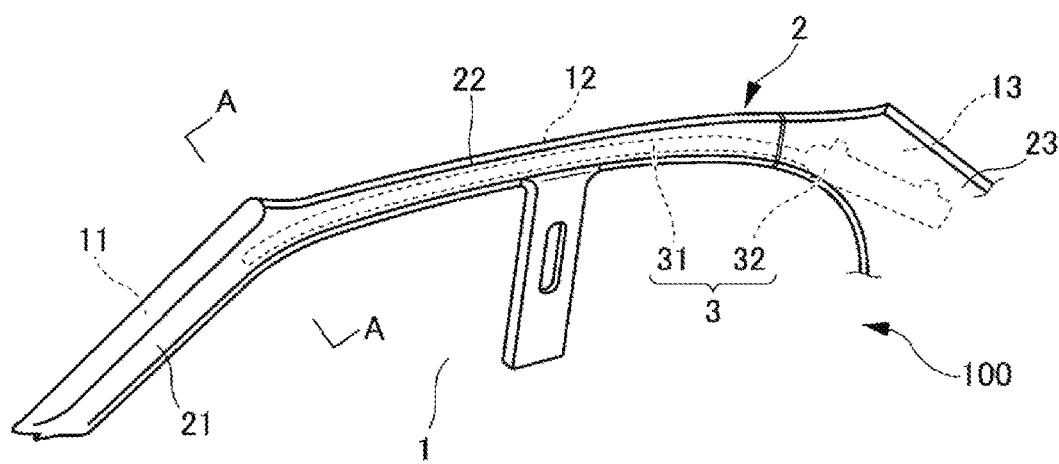
FIG. 1 is a perspective view of an upper edge of a door opening of the automobile as seen from the cabin side.

In the following, with reference to the drawings, a detailed description will be given of embodiments for carrying out the present invention (hereinafter referred to as "the embodiments"). Throughout the description of the embodiments, an identical element is denoted by an identical reference character.

In the following embodiments, while a front pillar garnish 21 is exemplarily shown as an automotive interior component, the present invention is not limited to the front pillar garnish 21. For example, the present invention is applicable to an automotive interior component such as a side rail garnish 22 or a rear pillar garnish 23.

First Embodiment

In the following, with reference to FIGS. 1 to 3, a detailed description will be given of a front pillar garnish according to a first embodiment of the present invention.

FIG. 1 is a side view of the upper edge of a door opening 1 of an automobile as seen from the cabin side. FIG. 2 is a cross-sectional view taken along line A-A in FIG. 1. FIG. 3 is a perspective view of a front pillar garnish (an automotive interior component) according to the first embodiment of the present invention as seen from the rear surface side.

As shown in FIG. 1, an automobile 100 includes the door opening 1 for allowing the user to enter or exit. The upper edge of the door opening 1 is implement by a front pillar 11, a side rail 12, and a rear pillar 13.

A garnish 2 is formed of a front pillar garnish 21, a side rail garnish 22, and a rear pillar garnish 23 having their ends coupled to each other. The garnish 2 covers the front pillar 11, the side rail 12, and the rear pillar 13 to trim the cabin.

An airbag device 3 includes an airbag 31 installed as being folded, and an inflator 32 configured to generate gas for inflating and deploying the airbag 31.

Figure 2:
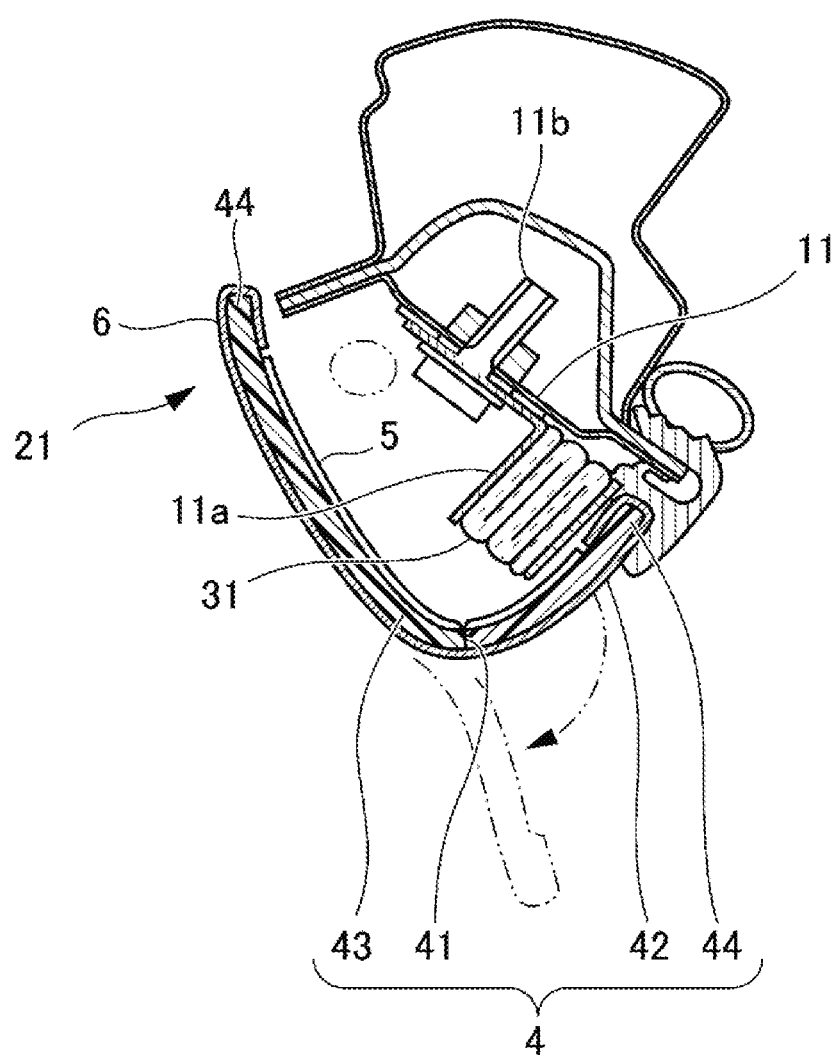
FIG. 2 is a cross-sectional view taken along line A-A in FIG. 1.

As shown in FIG. 2, the airbag 31 is at least partially housed as being folded in the space created between the front pillar 11 and the front pillar garnish 21.

Note that, as shown in FIG. 1, the inflator 32 is housed in the space created between the rear pillar 13 and the rear pillar garnish 23.

On the side of the surface (the cabin side) opposing to the front pillar garnish 21 of the front pillar 11, a housing part 11a for housing the airbag 31 is mounted via a fastening member 11b.

Figure 3:
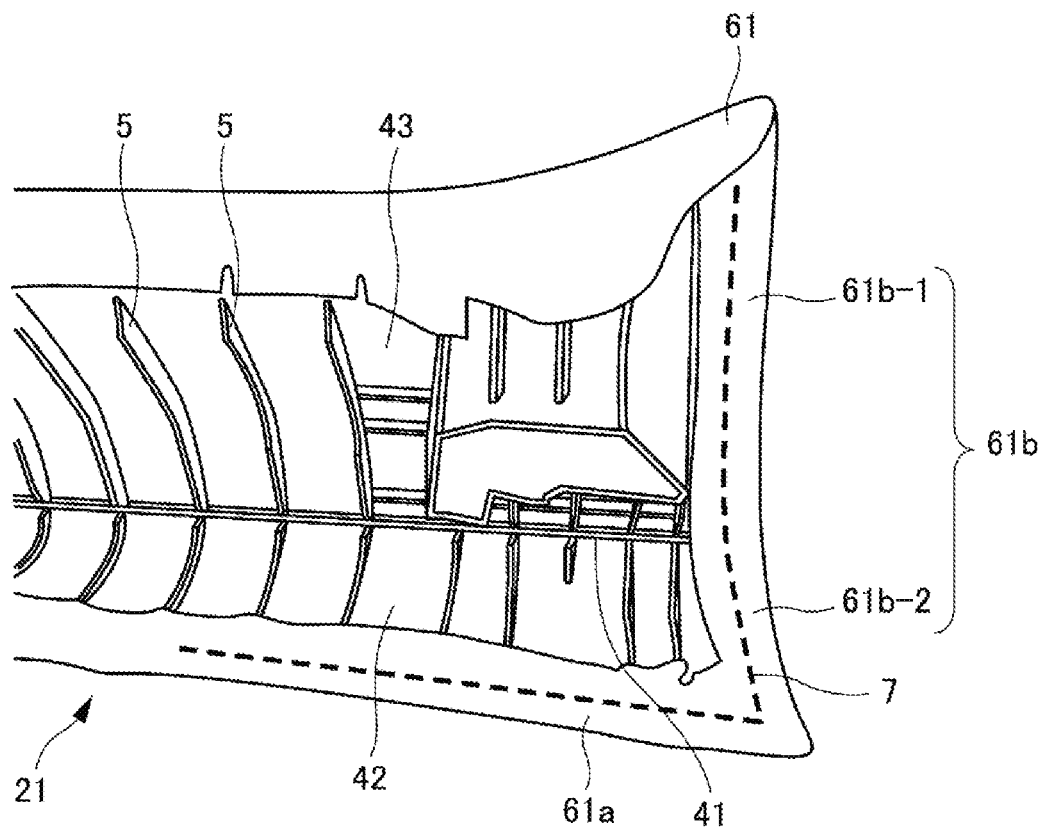
FIG. 3 is a perspective view of an automotive interior component according to a first embodiment of the present invention as seen from the rear surface side.

As shown in FIGS. 2 and 3, the front pillar garnish 21 includes: a core member 4 which covers, on the cabin side, the front pillar 11; a plurality of reinforcement ribs 5 formed at the rear surface of the core member 4 which rear surface is on the vehicle body side, and a surface member 6 stretched so as to cover the front surface of the core member 4 on the cabin side.

The material of the core member 4 may be thermoplastic resin, such as, for example, polyethylene-based resin, polypropylene-based resin, polystyrene-based resin, polyethylene terephthalate-based resin, polyvinyl alcohol-based resin, vinyl chloride-based resin, polyamide-based resin, polyacetal-based resin, polycarbonate-based resin, ionomer-based resin, ABS resin or the like.

Note that, the thermoplastic resin may be mixed with filler such as reinforcement fibers or reinforcement particles as appropriate, and may contain an additive such as a coloring agent or a fire retardant as appropriate.

As shown in FIGS. 1 to 3, the core member 4 is substantially L-shaped as seen in a cross-sectional view, and elongated to extend in the longitudinal direction of the front pillar 11.

The core member 4 includes: a hinge part 41 which is provided at a bending site and fragile as compared to other portion; an airbag door 42 which forms an opening for the airbag 31 to burst into the cabin; and a body part 43 which is wider than the airbag door 42 as seen in a cross-sectional view.

The hinge part 41 is formed in the extending direction (the longitudinal direction) of the core member 4, and thinner than other portion of the core member 4.

The airbag door 42 is a site partitioned by the hinge part 41, and capable of abutting on the airbag 31. Between the airbag door 42 of the front pillar garnish 21 and the housing part 11a of the front pillar 11, the airbag 31 is housed as being folded and capable of abutting on the airbag door 42. Upon deployment of the airbag 31, the airbag door 42 opens toward the cabin about the hinge part 41 by the shock received from the airbag 31.

The body part 43 is a site partitioned by the hinge part 41, and does not abut on the airbag 31.

A plurality of reinforcement ribs 5 are formed over the body part 43 and the airbag door 42 so as to cross the hinge part 41 while being spaced apart from each other by a predetermined gap in the extending direction of the core member 4.

The material of the surface member 6 may be resin such as thermoplastic olefinic elastomer (TPO), thermoplastic polyurethane (TPU), or polyvinyl chloride (PVC).

The surface member 6 may be a multilayer body consisting of at least two layers including an upper layer and a lower layer. The surface member 6 may be a multilayer body in which an upper layer is a sheet formed of thermoplastic resin and a lower layer is formed of resin foam such as polyurethane foam, polyethylene foam, polypropylene foam, which may contain filler as appropriate. Note that, the surface member 6 may not be a multilayer body and may be a single-layer body.

As shown in FIGS. 2 and 3, the surface member 6 includes a fold part 61 which extends to the outer edge side of the rear surface of the core member 4 so as to cover an edge part 44 which connects between the front surface of the core member 4 and the rear surface of the core member 4 on the vehicle body side. The fold part 61 includes a first fold part 61a which does not cross the hinge part 41 and positioned on the airbag door 42 side, and a second fold part 61b which is bent from the first fold part 61a and crosses the hinge part 41.

The first fold part 61a is formed to extend in the extending direction of the core member 4 so as not to overlap with ends of the reinforcement ribs 5. The second fold part 61b is formed to extend across the body part 43 and the airbag door 42 so as to cross the hinge part 41.

Note that, the second fold part 61b is formed of a body-side second fold part 61b-1 on the body part 43 side, and a hatch-side second fold part 61b-2 on the airbag door 42 side.

As shown in FIG. 3, the first fold part 61a and the second fold part 61b are previously stitched with a thread 7. In detail, the first fold part 61a and the second fold part 61b are stitched continuously with one thread 7 in the extending direction of the first fold part 61a and the second fold part 61b. In more detail, one thread 7 alternately penetrates through the front and back surfaces of the first fold part 61a and the second fold part 61b, to extend in the extending directions of the first fold part 61a and the second fold part 61b.

Here, by virtue of the first fold part 61a and the second fold part 61b being stitched with one thread 7, the stitching is simplified as compared to the case where the first fold part 61a and the second fold part 61b are each stitched with one thread.

Note that, the thread 7 should be flexible (pliable), and may be, for example, twisted natural fibers such as wool or hemp, or twisted chemical fibers such as polyester.

The front pillar garnish 21 according to the first embodiment of the present invention provides the following effects.

That is, the front pillar garnish 21 according to the first embodiment of the present invention has the first fold part 61a and the second fold part 61b reinforced using just the thread 7. Accordingly, as compared to the reinforcement using a tape, the number of steps is reduced and variations in the product quality attributed to bonding the tape is avoided.

Furthermore, the thread 7 with which the first fold part 61a and the second fold part 61b are stitched is flexible (pliable). Therefore, the thread 7 does not hinder deployment of the airbag 31. Thus, the second fold part 61b crossing the hinge part 41 can also be stitched with the thread 7. This surely minimizes, upon deployment of the airbag 31, occurrence of cracks and breaks in the core member 4 and the surface member 6 which would otherwise result in scattering pieces of the core member 4 and the surface member 6 of the front pillar garnish 21 into the cabin.

Second Embodiment

In the following, with reference to FIG. 4, a detailed description will be given of a front pillar garnish according to a second embodiment of the present invention.

Figure 4:
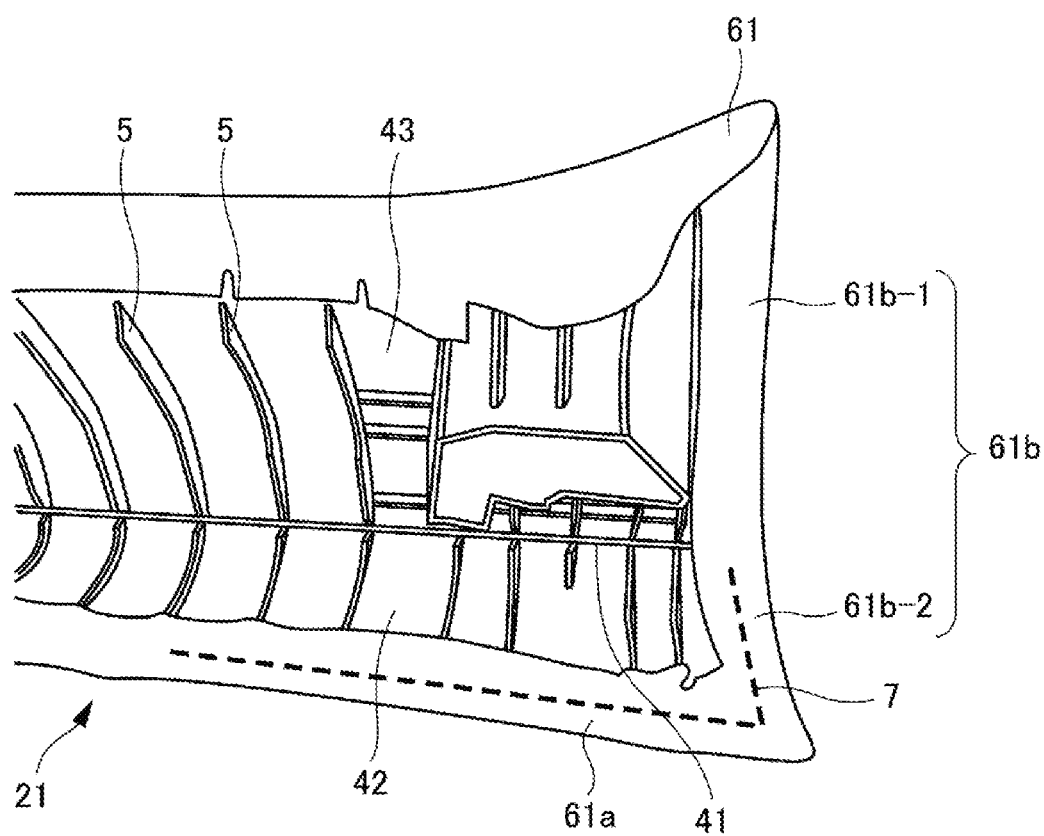
FIG. 4 is a perspective view of an automotive interior component according to a second embodiment of the present invention as seen from the rear surface side.

FIG. 4 is a perspective view of the front pillar garnish (an automotive interior component) according to the second embodiment of the present invention as seen from the rear surface side.

The second embodiment is identical to the first embodiment in that the first fold part 61a is previously stitched with the thread 7. As shown in FIG. 4, the second embodiment is different from the first embodiment in that the second fold part 61b has just the hatch-side second fold part 61b-2 previously stitched with the thread 7 so as to avoid the portion of the second fold part 61b corresponding to the hinge part 41 (that is, the boundary between the body-side second fold part 61b-1 and the hatch-side second fold part 61b-2) from being stitched with the thread 7.

Therefore, in addition to the effect exhibited by the first embodiment, the following effect is exhibited. That is, since the second fold part 61b just has the hatch-side second fold part 61b-2 stitched with the thread 7, the portion of the second fold part 61b corresponding to the hinge part 41 is avoided from being stitched with the thread 7. Thus, any hindrance to deployment of the airbag 31 is surely prevented.

Third Embodiment

In the following, with reference to FIG. 5, a detailed description will be given of a front pillar garnish according to a third embodiment of the present invention.

Figure 5:
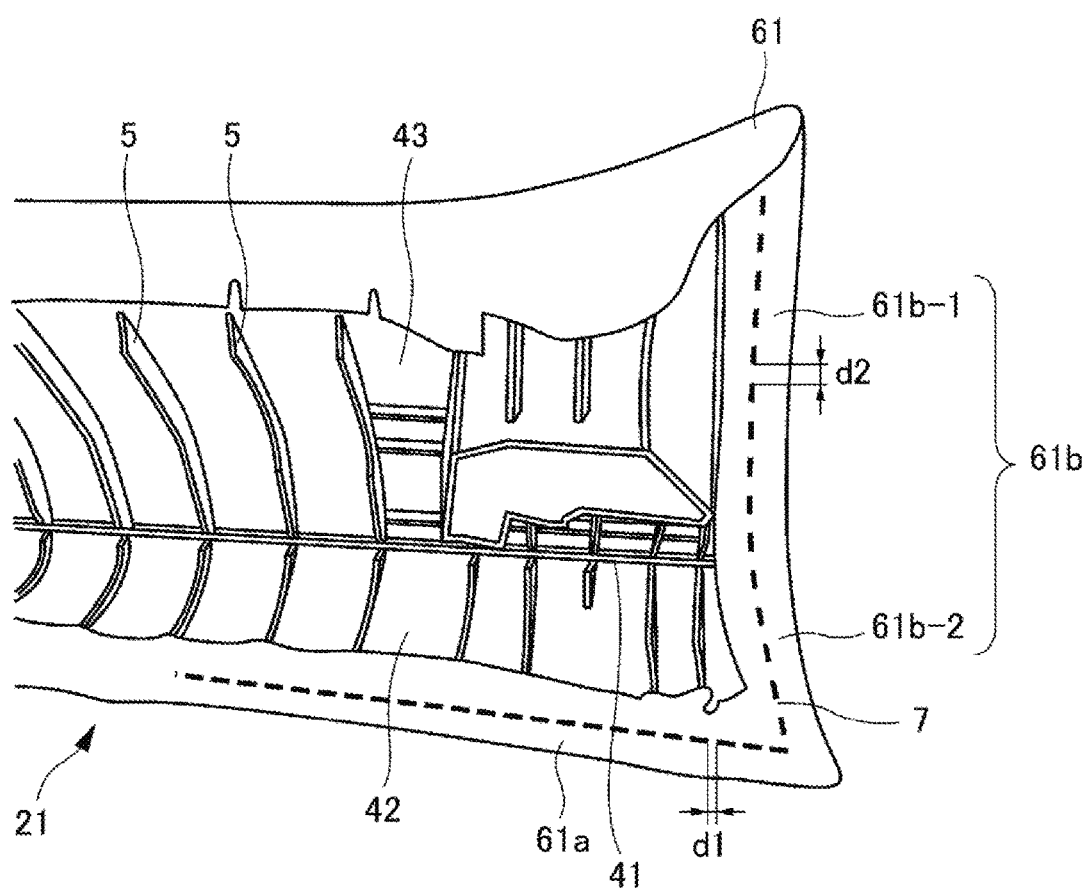
FIG. 5 is a perspective view of an automotive interior component according to a third embodiment of the present invention as seen from the rear surface side.

FIG. 5 is a perspective view of the front pillar garnish (an automotive interior component) according to the third embodiment of the present invention as seen from the rear surface side.

The third embodiment is identical to the first embodiment in that the first fold part 61a and the second fold part 61b are previously stitched with the thread 7. As shown in FIG. 5, the third embodiment is different from the first embodiment in that a first pitch $d1$ of the thread 7 at which the first fold part 61a is stitched is smaller than a second pitch $d2$ of the thread 7 at which the second fold part 61b is stitched.

Therefore, in addition to the effect exhibited by the first embodiment, the following effect is exhibited. That is, since the reinforcement strength of the first fold part 61a is set to be greater than the reinforcement strength of the second fold part 61b, the reinforcement strength of the second fold part 61b can be set so as not to hinder deployment of the airbag 31 while the reinforcement strength of the first fold part 61a of at least a predetermined value is obtained.

Fourth Embodiment

In the following, with reference to FIG. 6, a detailed description will be given of a front pillar garnish according to a fourth embodiment of the present invention.

Figure 6:
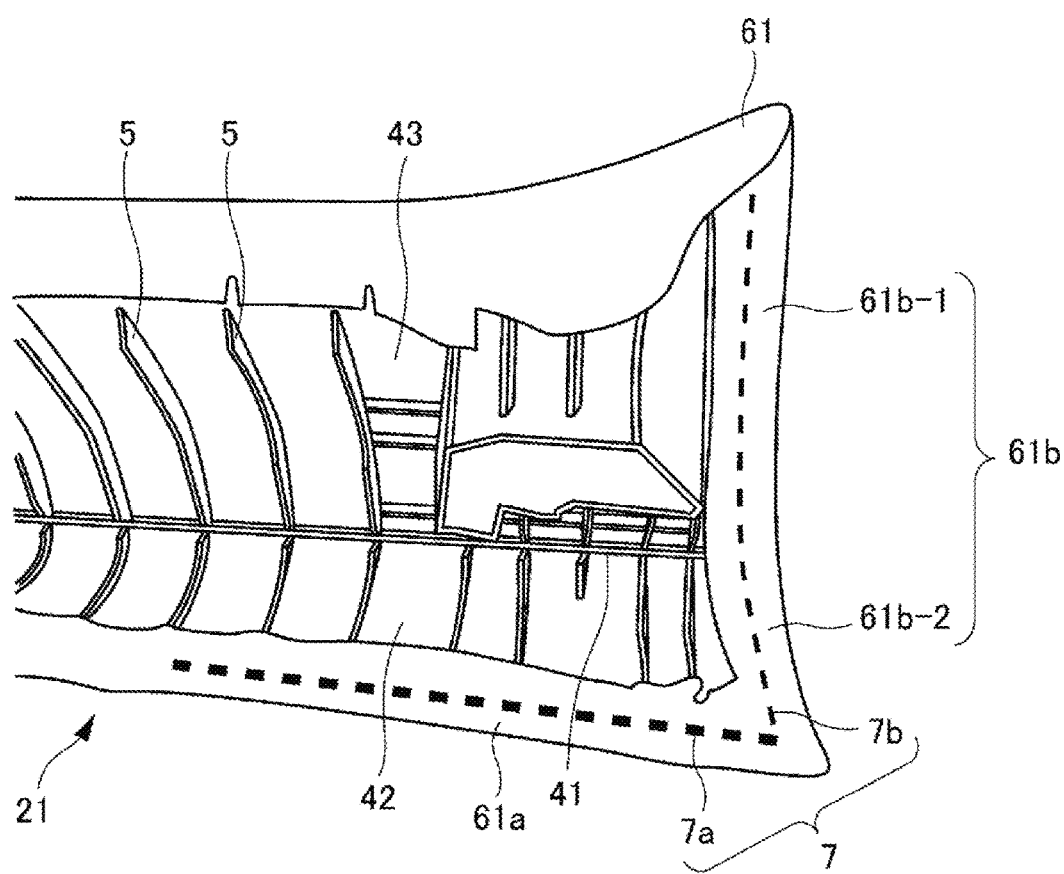
FIG. 6 is a perspective view of an automotive interior component according to a fourth embodiment of the present invention as seen from the rear surface side.
Figure 7:
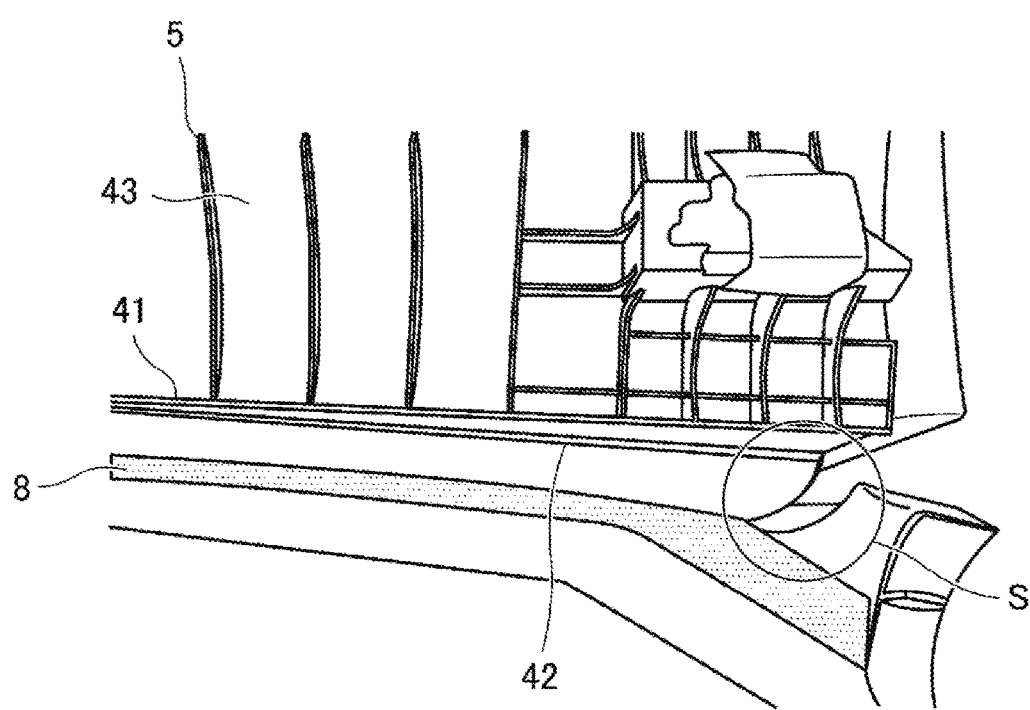
FIG. 7 is a perspective view of a conventional automotive interior component on which an aluminum tape is bonded as seen from the rear surface side.

FIG. 6 is a perspective view of the front pillar garnish (an automotive interior component) according to the fourth embodiment of the present invention as seen from the rear surface side.

The fourth embodiment is identical to the first embodiment and the second embodiment in that the first fold part 61a and the second fold part 61b are previously stitched with the thread 7. As shown in FIG. 6, the fourth embodiment is different from the first embodiment and the second embodiment in that a first thread 7a with which the first fold part 61a is stitched is thicker than the second thread 7b with which the second fold part 61b is stitched.

Therefore, similarly to the third embodiment, in addition to the effect exhibited by the first embodiment, the following effect is exhibited. That is, since the reinforcement strength of the first fold part 61a is set to be greater than the reinforcement strength of the second fold part 61b, the reinforcement strength of the second fold part 61b can be set so as not to hinder deployment of the airbag 31 while the reinforcement strength of the first fold part 61a of at least a predetermined value is obtained.

The front pillar garnish 21 of the present invention includes: a core member 4 which covers, on the cabin side, the front pillar 11 and includes the hinge part 41; and the surface member 6 stretched so as to cover the front surface of the core member 4 on the cabin side. The airbag door 42 is a site of the core member partitioned by the hinge part 41 and the site is capable of abutting on the airbag 31. The surface member 6 includes the fold part 61 which extends to the outer edge side of the rear surface of the core member 4 on the vehicle body side so as to cover the edge part 44 which connects between the front surface of the core member 4 and the rear surface of the core member 4. The fold part 61 includes the first fold part 61a which does not cross the hinge part 41 and positioned on the airbag door 42 side, and a second fold part 61b which is bent from the first fold part 61a and crosses with the hinge part 41. The first fold part 61a and the second fold part 61b are stitched with a thread.

The present invention provides an automotive interior component which is manufactured through simple steps, and which surely minimizes, upon deployment of the airbag, occurrence of cracks and breaks in the core member and the surface member which would otherwise result in scattering pieces of part of the core member and the surface member into the cabin.

In the foregoing, a description has been given of the present invention with reference to the embodiments. It goes without saying that the technical scope of the present invention is not limited to the scope of the invention recited in the embodiments. It is apparent for a person skilled in the art that various modifications or improvements can be made on the embodiments. Furthermore, from the scope of claims, it is apparent that the embodiments with such modifications or improvements are also included in the technical scope of the present invention.

REFERENCE SIGNS LIST 1 door opening
2 garnish
3 airbag device
4 core member
5 reinforcement rib
6 surface member
7 thread
7a first thread
7b second thread
8 aluminum tape
11 front pillar
11a housing part
11b fastening member
12 side rail
13 rear pillar
21 front pillar garnish (automotive interior component)
22 side rail garnish
23 rear pillar garnish
31 airbag
32 inflator
41 hinge part
42 airbag door
43 body part
44 edge part
61 fold part
61a first fold part
61b second fold part
61b-1 body-side second fold part
61b-2 hatch-side second fold part
100 automobile
d1 first pitch
d2 second pitch
S outside-tape region

The invention claimed is:

1. An automotive interior component including an airbag door, an airbag being housed as being folded between the airbag door and a pillar, the airbag door forming an opening for the airbag to burst into a cabin by inflation and deployment, the automotive interior component comprising:
   a core member covering, on a cabin side, the pillar and including a hinge part being fragile as compared to other portion; and
   a surface member stretched so as to cover a front surface of the core member on the cabin side, wherein
   the airbag door is a site of the core member partitioned by the hinge part, the site being capable of abutting on the airbag,
   the surface member includes a fold part extending to an outer edge side of a rear surface of the core member on a vehicle body side so as to cover an edge part connecting between the front surface of the core member and the rear surface of the core member,
   the fold part includes a first fold part not crossing the hinge part and positioned on an airbag door side, and a second fold part bent from the first fold part and crossing the hinge part, and
   the first fold part and the second fold part are stitched with a thread.

2. The automotive interior component according to claim 1, wherein the first fold part and the second fold part are stitched with the thread while a portion of the second fold part corresponding to the hinge part is avoided from being stitched.

3. The automotive interior component according to claim 2, wherein the first fold part and the second fold part are continuously stitched with the thread.

4. The automotive interior component according to claim 1, wherein the first fold part and the second fold part are continuously stitched with the thread.

5. The automotive interior component according to claim 1, wherein a first pitch of the thread at which the first fold part is stitched is smaller than a second pitch of the thread at which the second fold part is stitched.

6. The automotive interior component according to claim 1, wherein a first thread with which the first fold part is stitched is thicker than a second thread with which the second fold part is stitched.

* * * * *